Figure 1:
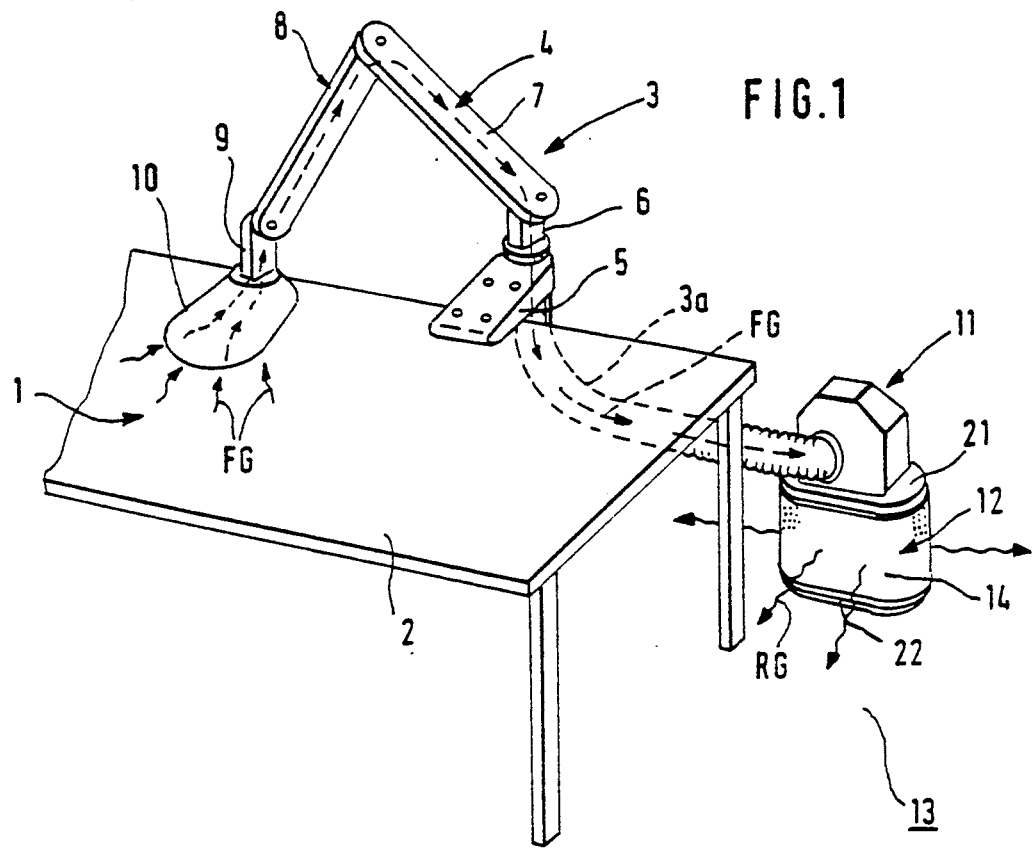

United States Patent [19]
Karlsson

[11] Patent Number: 5,125,939
[45] Date of Patent: Jun. 30, 1992

[54] FILTER CONTAINER

[75] Inventor: Hakan R. Karlsson, Eslöv, Sweden

[73] Assignee: AB Ph. Nederman & Co., Org, Sweden

[21] Appl. No.: 621,037

[22] Filed: Nov. 30, 1990

[30] Foreign Application Priority Data

Dec. 6, 1989 [SE] Sweden ............................ 8904113

[51] Int. Cl.⁵ .............................................. B01D 46/00
[52] U.S. Cl. ........................................ 55/316; 55/387; 55/473; 454/65
[58] Field of Search ................ 55/467, 473, 316, 387; 98/115.4

[56] References Cited

U.S. PATENT DOCUMENTS

| | | | |
|---|---|---|---|
| 2,243,637 | 5/1941 | Landis et al. ............... | 219/69 R |
| 4,322,230 | 3/1982 | Schoen et al. ............... | 55/316 |
| 4,388,514 | 6/1983 | Coughlin et al. ............ | 55/473 |
| 4,446,861 | 7/1984 | Tada ............................ | 98/115.4 |
| 4,477,270 | 10/1984 | Tauch .......................... | 55/316 |

FOREIGN PATENT DOCUMENTS

| | | | |
|---|---|---|---|
| 3534318 | 4/1987 | Fed. Rep. of Germany | 55/316 |
| 2108482 | 5/1972 | France . | |

Primary Examiner—Bernard Nozick
Attorney, Agent, or Firm—Tarolli, Sundheim & Covell

[57] ABSTRACT

An apparatus for filtering contaminated gases. An extraction device provides a slow passage for the gases. The extracton device is in fluid communication with an intake port of a fan aggregation. The fan aggregation provides a vacuum for drawing the gases through the extraction device. The fan aggregation is rigidly supported on top of a filtration container. The gases are expelled by the fan aggregate through an exhaust port and into an interior chamber of the filtration container. A filter blocks the passage of contaminant components of the gases and permits the passage of noncontaminant of the gases from the interior chamber to the atmosphere. A gas-permeable housing surrounds the filter to retain the filter and support the weight of the aggregate.

9 Claims, 2 Drawing Sheets

FILTER CONTAINER

The present invention relates to a filter container for filtering contaminated gases at spot extraction systems, whereby a fan aggregate is provided to suck contaminated gases into the spot extraction system.

Filter containers at spot extraction systems are often stationary mounted somewhere in a conduit in the system and are therefore hard to reach for maintenance or exchange. In those cases they are more easily accessible, they are either provided on a stand or mounted on a carriage. These stands or carriages are often heavy and bulky and constitute expensive units. Openly mounted, easily accessible filter containers are on the other hand often surrounded by housings for forcing the gases to flow in a correct path into and out of the filter container. However, such housings must normally be removed in order to get to the filter members for maintenance or exchange and mounting and demounting of the housings are often time and labour consuming.

The object of the present invention is to provide a simple filter container which eliminates the abovementioned drawbacks.

The object of the present invention is satisfied by providing an apparatus for filtering contaminated gases, the apparatus includes an extraction device. The extraction device provides a flow passage for the gases. The apparatus includes a fan aggregate which has intake and exhaust ports. The fan aggregate provides a vacuum for drawing the gases along the flow passage and into the intake port. The fan aggregate also provides a pressure for expelling the gases out of the exhaust port.

The apparatus includes a filtration container for entrapping contaminant components of the gases. The filtration container includes a tubular filter. The tubular filter partially defines an interior chamber for receiving the gases expelled from the exhaust port of the fan aggregate. The tubular filter blocks passage of the contaminant components of the gases from the interior chamber to an atmosphere external to the filtration container. The tubular filter permits passage of non-contaminant components of the gases to the atmosphere.

The filtration container includes a gas-permeable tubular housing surrounding the tubular filter. The tubular housing retains the tubular filter. The tubular housing supports the weight of the fan aggregate above the filtration container.

In view of the above, it is contemplated to use the filter container as a stand for the fan aggregate and as a silencer for silencing or absorbing noise from the fan. Furthermore, it is easy to obtain a tight connection between the fan aggregate and the filter container.

Figure 2:
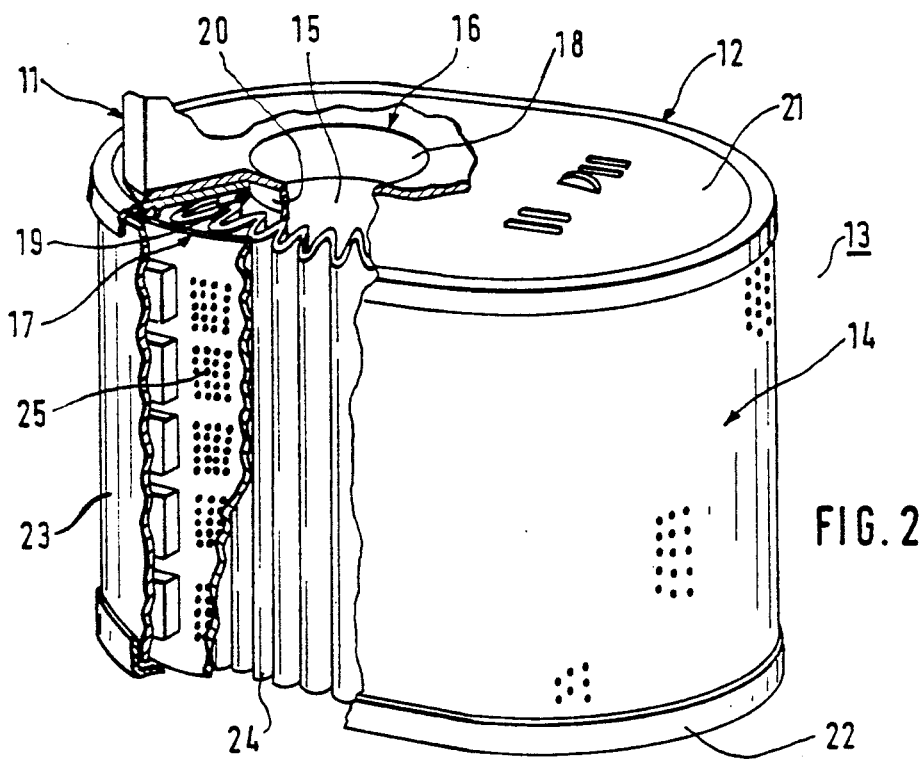
Figure 3:
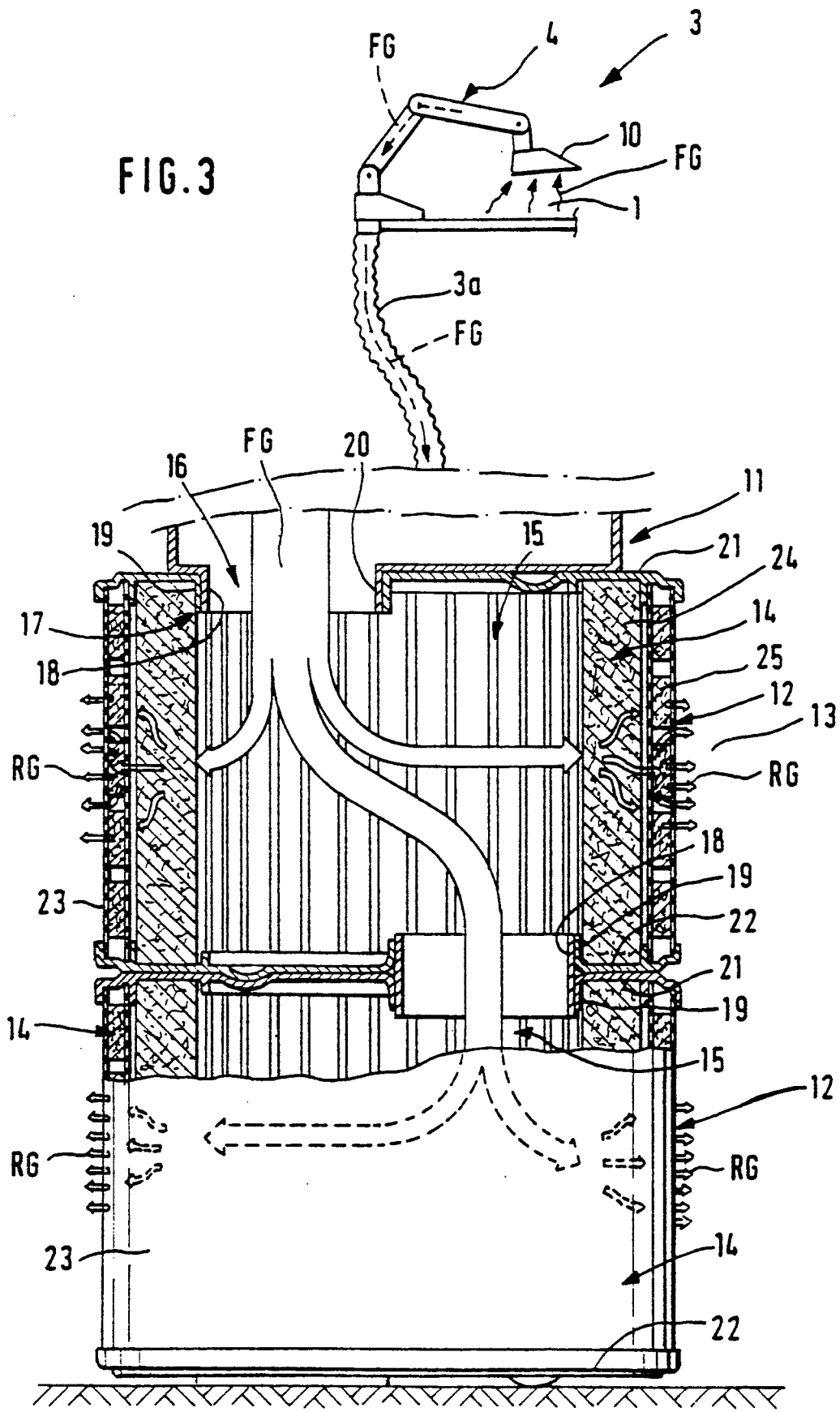

The invention will be further described below with reference to the accompanying drawings, in which FIG. 1 is a perspective view of a filter container according to the invention when it is connected to a spot extraction system;

FIG. 2 is a perspective view of the filter container of FIG. 1 in a somewhat cut condition; and FIG. 3 is a sectional view through two interconnected filter containers according to FIG. 1 and 2.

In FIG. 1 there is shown a working place 1 from which contaminated gases FG shall be sucked away or extracted and this working place 1 is here shown as being a work bench 2 for the process of soldering. For sucking away or extracting contaminated gases FG from the working place 1, a spot extraction system or device 3 of any suitable type is used, e.g. a spot extraction aggregate 4 as shown. The aggregate 4 provides a flow passage for the contaminated gases FG from the working place 1 to a remote location. This aggregate 4 can be fastened to the work bench 2 through a bracket 5 on which a movable arm system 6, 7, 8, 9 is provided, and this arm system 6-9 is adapted to hold a suction hood 10 in any suitable position relative to the working place 1 from which extraction of contaminated gases FG is intended. In this case the gases FG sucked or drawn into the suction hood 10 are brought further away while the various parts of the arm system 6-9 are hollow, but as an alternative it is also possible to use an arm system carrying a hose or a tube through which the contaminated gases are sucked away from the suction hood 10.

Suction or extraction of the contaminated gases FG through the spot extraction system is accomplished by a fan aggregate 11 which provides a vacuum. The fan aggregate 11 connected to a conduit 3a of the spot extraction system 3. The conduit 3a is connected to the spot extraction aggregate 4. The contaminated gases FG are drawn through the spot extraction system 3 and into an intake port of the fan aggregate 11. The contaminated gases FG are moved through the fan aggregate and into a filtration or filter container 12. The filter container 12 filtrates the contaminated gas FG such that the gas RG discharged from the filter container 12 into the surroundings 13 is clean.

In order to provide a simple, flexible fan-filter container unit which eliminates the need for special stands and silencers and in which the members forming part thereof are easily exchangeable due to their accessability and, when required, easily movable, the filter container 12 is adapted to permit positioning of the fan aggregate 11 thereon in such a manner that the interior of the fan aggregate 11 communicates with a space 15 inside a filter body 14 in the filter container 12, whereby the filter aggregate 11 can bring contaminated gases FG sucked in through the spot extraction system 3 to flow into said space 15 in the filter body 14. Additionally, the fan aggregate 11 is provided to bring contaminated gases FG to flow out of the inner space 15 into the surroundings 13 through the filter body 14. The contaminated gases FG are thus, by the fan aggregate 11, sucked into the suction hood 10 and through the conduit 3a into the inner space of the fan aggregate 11 itself, and are discharged therefrom by means of the active members (not shown) of the fan aggregate 11 and brought to flow into the inner space 15 of the filter body 14 and through said filter body 14 wherein the gas is filtrated and finally discharged into the surroundings 13 as clean gas RG.

For easy mounting and demounting of the fan aggregate 11, the filter container 12 preferably permits quick-connection of the fan aggregate 11 thereto, and this connecting operation is facilitated while the filter container 11 thereby forms a stand for the fan aggregate. The filter container 12 functioning as a stand preferably retains the fan aggregate 11 connected thereto such that a gas discharge portion (exhaust port) 16 of said fan aggregate 11 is tightly connected with a gas inlet portion 17 of the filter container 12. It is hereby ensured that the filter container 12 can be moved without loosening of the fan aggregate 11, and it is also ensured that the contaminated gas FG can not leak out when the fan aggregate 11 discharges the gas from the interior thereof to the inner space 15 of the filter body 14.

The gas discharge portion 16 of the fan aggregate 11 may have or consist of a simple tube member 18 which is fixedly connected with the fan aggregate 11 or consist of a separate member which is connectable to the fan aggregate 11. The gas inlet portion 17 of the filter container 12 may preferably have edge portions 19 to an aperture 20 in the filter container 12.

The fan aggregate 11 is preferably connected to the filter container 12 by moving the tube member 18 thereof into the aperture 20 such that said tube member 18 tightly engages the edge portions 19. Hereby, the tube member 18 and the edge portions of the aperture 20 defines a tight connection as well as an effective coupling which retains the fan aggregate 11 on the filter container 12.

If a separate tube member 18 is used, this member may e.g. be moved a distance into the aperture 20, whereafter the fan aggregate may be threaded onto the tube member 18 from above such that said tube member 18 protrudes into an aperture in the fan aggregate when said fan aggregate is placed on the filter container 12.

The filter body 14 of the filter container 12 preferably is shaped as a tube with oval or circular cross section and open end portions of the filter container 12 are closed by means of two end portions or members 21 and 22 of which at least one end portion 21 and/or 22 and preferably both end portions 21, 22 are adapted to permit positioning of the fan aggregate 11 thereon and connection of the fan aggregate thereto. Hereby, it is possible to provide all connection and coupling and supporting members of the filter container 12 for the fan aggregate 11 on the end portions 21 and/or 22, which means that the filter body 14 need not be loaded with these members.

Thus, the edge portions 19 and the apertures 20 can be provided in one end portion 21 or 22 or in both end portions 21, 22 and the fan aggregate 11 can be placed engaging and connected to the end portion 21 facing upwards at present, while the opening 20 of the end portion 22 facing downwards for the moment can be sealed or closed by means of a plug (not shown). In such a case the filter container 12 can be mounted with the downwardly facing end portion 22 engaging a support, whereby a stand is provided comprising a filter container 12. Alternatively, one can provide a stand consisting of two or more filter containers 12 standing on top of each other and communicating with each other.

The filter body 14 of the filter container 12 preferably forms a standing, in various lateral directions gas permeable tube, which eventually is surrounded by a gas permeable protective housing 23. This filter body 14, eventually also the surrounding protective housing 23, preferably has such a rigidity that itself can carry the load from a fan aggregate 11 provided on top of the filter container 12 and eventually from one or more filter containers 12 disposed on top of said filter container 12 and a fan aggregate 11 on top of the uppermost filter container 12.

The filter body 14 filtrates and discharges gases, preferably to the surroundings 13 about the entire or at least the larger part of its periphery and along the entire or at least the larger part of its height, and since the height of the filter body is almost similar to the height of the filter container 12 and the periphery of the filter container 12 is similar to the periphery of the filter body 14, almost the entire height and periphery of the filter container 12 are utilized for filtration and discharge of the gases in question.

The filter body 14 preferably includes a particle filter 24 and a carbon filter 25 provided outside the particle filter and said particle filter 24 preferably comprises several layers of folded filter material, whereby one layer of the folded filter material layers is made of a micro filter material of fibre glass type and another layer is made of a polyester material. The carbon filter 25 preferably comprises a layer of or with active carbon.

The end portions 21, 22 are preferably identical or identical with the exception of female and male parts which, when mounting two filter containers 12 on top of each other, are adapted to engage each other to prevent sliding of the filter containers relative to each other (e.g. for preventing rotation of one filter container relative to the other). The end portions 22, 22 preferably have an oval shape and the aperture 20 in one end portion 21 can be situated on one side of central portions of the filter containers 12, while the aperture 20 in the other end portion 22 is situated on the other side of said central portions.

The conduit 3a that connects the fan aggregate 11 to the spot extraction aggregate 4, preferably consists of a flexible hose permitting positioning of the filter container 12 and the fan aggregate 11 disposed thereon in one or more different positions relative to the spot extraction aggregate 4. This means that the filter container 12 with its fan aggregate 11 e.g. may be placed in any suitable position beneath or behind the work bench 2 and the filter container/fan aggregate loads neither the spot extraction aggregate 4 nor the work bench 2. By selecting the correct length for the conduit 3a, the filter container/fan aggregate can be positioned completely hidden if required. The conduit 3a can be quick-connectable to the fan aggregate and/or the extraction aggregate according to the "snap-in" principal, which among other things facilitates mounting and demounting of the spot extraction aggregate or the filter container/fan aggregate.

The invention is not limited to what is described above and shown in the drawings, but may vary within the scope of the following claims. Thus, extraction of contaminated gases may occur from another appropriate place than a working place where soldering is carried out; the spot extraction aggregate can be of another type than shown and it can be arranged in another way than shown; there can be more than one spot extraction aggregate; there can be more than one fan aggregate and the fan aggregate can be of prior art type. The filter container 12 can be replaced by another by simply disconnecting the fan aggregate 11 when the filter body 14 no longer has the required filtering effect. Eventually, the filter container may entirely consist of destructable material, whereby an unusable filter container can be thrown away instead of replacing the filter body by a new filter body and reuse the remaining members.

I claim:

1. An apparatus for filtering contaminated gases in a work area, said apparatus comprising:
   an extraction device for providing a conduit flow passage for the gases from the work area;
   a fan aggregate for forcing a flow of the gases, said fan aggregate including a housing having an intake port and an exhaust port, said intake port being connected with said extraction device, said fan aggregate providing a vacuum for drawing the gases along the conduit flow passage and into said intake port, said fan aggregate providing pressure for expelling the gases out of said exhaust port; and a filtration container for entrapping contaminant components of the gases, said filtration container being connected with said fan aggregate, said filtration container including a tubular filter means partially defining an interior chamber for receiving the gases expelled from said exhaust port of said fan aggregate, said tubular filter means blocking passage of the contaminant components of the gases from the interior chamber to an atmosphere external to said filtration container and permitting passage of non-contaminant components of the gases to the atmosphere, said filtration container including an end portion, said end portion being in engagement with said fan aggregate, said end portion supporting said fan aggregate above said filtration container, said filtration container including a gas-permeable tubular housing surrounding said tubular filter means for retaining said tubular filter means, said housing supporting said end portion to support said fan aggregate.

2. An apparatus as set forth in claim 1, wherein said tubular filter means permits passage of non-contaminant components of the gases at substantially all locations on the periphery of said tubular filter means, said tubular housing being gas-permeable at substantially all locations on the periphery of said tubular housing.

3. An apparatus as set forth in claim 1, wherein said filtration container, including the chamber, said tubular filter means and said tubular housing are a first filtration container, a first chamber, a first tubular filter means and a first tubular housing, respectively, said apparatus including a second filtration container, said second filtration container including a second tubular filter means partially defining a second interior chamber, the second chamber being in fluid communication with the first chamber for receiving a portion of the gases being expelled from the fan aggregate, said second tubular filter means blocking passage of the contaminant components of the gases and permitting passage of non-contaminant components of the gases to the atmosphere, said second filtration container further including a second tubular gas-permeable housing surrounding said second tubular filter means for retaining said second tubular filter means and for supporting the weight of said first filtration container and said fan aggregate above said second filtration container.

4. An apparatus as set forth in claim 3, wherein said first filtration container includes first and second end members for enclosing the first chamber, said second filtration container includes third and fourth end members for enclosing the second chamber, said first end member being in engagement with upper ends of said first tubular filter means and said first tubular housing, said first end member including means defining an inlet into the first chamber, said exhaust port of said fan aggregate being in engagement with said means defining the inlet into the first chamber for permitting expulsion of the gases from the fan aggregate into the first chamber, said second end member being in engagement with lower ends of said first tubular filter means and said first tubular housing, said second end member including means defining an outlet out of the first chamber, said third end member being in engagement with upper ends of said second tubular filter means and said second tubular housing, said third end member including means defining an inlet into the second chamber, said means defining an outlet out of the first chamber being in engagement with said means defining an inlet into the second chamber for providing the fluid communication between the first and second chambers, said forth end member being in engagement with lower ends of said second tubular filter means and said second tubular housing, said second end member blocking flow of the gases from the second chamber to the atmosphere.

5. An apparatus as set forth in claim 4, including a tubular member extending between said means defining the outlet out of said first chamber and said means defining the inlet into the second chamber, said tubular member providing a rigid connection between the first and second filtration containers.

6. An apparatus as set forth in claim 1, wherein said filtration container includes first and second end members for enclosing the chamber, said first end member being in engagement with upper ends of said tubular filter means and said tubular housing, said first end member including means defining an inlet into the chamber, said exhaust port of said fan aggregate being in engagement with said means defining an inlet for permitting expulsion of the gases from said fan aggregate into the chamber, said second end member being in engagement with lower ends of said tubular filter means and said tubular housing, said second end member blocking flow of the gases from the chamber to the atmosphere.

7. An apparatus as set forth in claim 6, wherein said fan aggregate including a tubular member, said tubular member defining said exhaust port of said fan aggregate, said means defining an inlet including edge portions which define an aperture through said first end member, said tubular member being positioned in the aperture such that said tubular member tightly engages said edge portions, said filtration container including coupling means for retaining said fan aggregate in the position above said filtration container.

8. An apparatus as set forth in claim 1, wherein said tubular filter means includes a first filter element for blocking passage of particulate contaminant components of the gases and a second filter element including carbon material.

9. An apparatus as set forth in claim 8, wherein said first filter element includes a first layer of fiberglass and a second layer of polyester, said carbon material being activated carbon.

* * * * *